(12) United States Patent
Jeon et al.

(10) Patent No.: US 12,529,832 B2
(45) Date of Patent: Jan. 20, 2026

(54) PROTECTIVE FILM AND DISPLAY APPARATUS INCLUDING THE SAME

(71) Applicant: LG DISPLAY CO., LTD., Seoul (KR)

(72) Inventors: Hyeongmin Jeon, Seoul (KR); Suk Choi, Hwaseong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 749 days.

(21) Appl. No.: 17/825,513

(22) Filed: May 26, 2022

(65) Prior Publication Data

US 2022/0381958 A1 Dec. 1, 2022

(30) Foreign Application Priority Data

May 27, 2021 (KR) .................. 10-2021-0068161

(51) Int. Cl.
*G02B 5/20* (2006.01)
*G02B 1/00* (2006.01)
(Continued)

(52) U.S. Cl.
CPC ............. *G02B 5/206* (2013.01); *G02B 1/002* (2013.01); *G02B 1/14* (2015.01);
(Continued)

(58) Field of Classification Search
CPC ......... G06F 1/1652; G02B 1/14; G02B 5/206; G02B 1/002; G02B 5/003; G02B 2207/101; G02F 1/133512; G02F 1/133331; G02F 1/136209; G02F 1/1339; G02F 1/161; G02F 1/1679; G02F 1/107; G02F 1/133305; G02F 1/133388; G02F 2202/28; G09F 9/301
See application file for complete search history.

(56) References Cited

U.S. PATENT DOCUMENTS 10,185,058 B2   1/2019  Snyder et al.
10,928,667 B2   2/2021  Fuji
(Continued)

FOREIGN PATENT DOCUMENTS

CN   110073254 A      7/2019
CN   110235032 A  *   9/2019  ............. B29C 41/02
(Continued)

OTHER PUBLICATIONS

Office Action issued on Apr. 26, 2024 in Chinese Patent Application No. 202210582420.X.
(Continued)

*Primary Examiner* — Jessica M Merlin
(74) *Attorney, Agent, or Firm* — Morgan, Lewis & Bockius LLP

(57) ABSTRACT

A protective film and a display apparatus including the same are disclosed. The display apparatus in the embodiments may include a protective film that is disposed on a display panel and includes a substrate and a light shielding layer being formed in the edge portion of the substrate, which corresponds to a non-display area of the display panel. The light shielding layer may include a first layer and a second layer on the first layer. The first layer may include at least two or more of first patterns that are spaced from each other and a plurality of second patterns that are disposed between at least two or more of the first patterns.

27 Claims, 8 Drawing Sheets

(51) Int. Cl.
  *G02B 1/14* (2015.01)
  *G02B 5/00* (2006.01)
  *G02F 1/1333* (2006.01)
  *G02F 1/1335* (2006.01)
  *G06F 1/16* (2006.01)
  *G09F 9/30* (2006.01)

(52) U.S. Cl.
  CPC .. *G02F 1/133305* (2013.01); *G02F 1/133331* (2021.01); *G02F 1/133512* (2013.01); *G06F 1/1652* (2013.01); *G09F 9/301* (2013.01); *G02B 5/003* (2013.01); *G02B 2207/101* (2013.01)

(56) References Cited

U.S. PATENT DOCUMENTS

| | | | | |
|---|---|---|---|---|
| 2009/0015901 | A1* | 1/2009 | Yamada | G02F 1/133502 359/259 |
| 2013/0082961 | A1* | 4/2013 | Wang | G06F 3/0412 345/173 |
| 2013/0154949 | A1* | 6/2013 | Jamshidi Roudbari | G06F 3/0412 349/110 |
| 2019/0165324 | A1* | 5/2019 | Zhou | H10K 71/00 |
| 2021/0064092 | A1* | 3/2021 | Kwon | G06F 1/189 |

FOREIGN PATENT DOCUMENTS

| | | | |
|---|---|---|---|
| CN | 110596939 | A | 12/2019 |
| JP | H10329496 | * | 12/1998 |
| JP | 2002-236210 | A | 8/2002 |
| JP | 2007056341 | A * | 3/2007 |
| JP | 2014-021768 | A | 2/2014 |
| JP | 2019015772 | A * | 1/2019 |
| KR | 10-2005-0066760 | A | 6/2005 |
| KR | 10-2018-0008204 | A | 1/2018 |
| TW | 201501944 | A | 1/2015 |

OTHER PUBLICATIONS

Office Action issued on Dec. 29, 2023 in Chinese Patent Application No. 202210582420.X.

* cited by examiner

PROTECTIVE FILM AND DISPLAY APPARATUS INCLUDING THE SAME

CROSS-REFERENCE TO RELATED APPLICATION

This application claims priority to and benefit of Korean Patent Application No. 10-2021-0068161 filed on May 27, 2021, which is hereby incorporated by reference as when fully set forth herein.

BACKGROUND

Technical Field

The present disclosure relates to a display apparatus, and in particular, a display apparatus including a protective film.

Discussion of the Related Art

In the information era, various types of display apparatuses that process and display a large amount of information have been developed. Display apparatuses that display images include a variety of display apparatuses such as a liquid crystal display (LCD) apparatus, an organic light-emitting diode (OLED) display apparatus, an electrophoresis (EPD) display apparatus and the like.

Currently, users tend to prefer a portable display apparatus having a large screen such that they can conveniently watch broadcast contents or videos, or play video games through the display apparatus. However, a larger screen of the portable display apparatus can cause deterioration in the portability of the apparatus, so there is a limit to enlarge the screen. To improve the portability of the portable display apparatus, research into a portable display apparatus has been conducted.

A display apparatus includes a display area that displays an image and a non-display area that surrounds the display area, and a protective film having a black matrix or a printing layer may be used such that a driving circuit, various wirings, a pad part and the like in the non-display area of a display panel are not seen from the outside.

SUMMARY

Protective films can be formed as a result of printing of a black matrix or a printing layer on a substrate. When the black matrix is formed on the substrate, the quality of the black matrix deteriorates depending on a method of printing the black matrix. For example, various defects in printing such as protruding, roughness, deterioration of an adhesive strength and the like of the black matrix occur. Accordingly, the present disclosure is directed to a protective film and a display apparatus including the protective film capable of improving the printing quality of the black matrix.

Accordingly, embodiments of the present disclosure are directed to a protective film and a display apparatus including the same that substantially obviate one or more of the problems due to limitations and disadvantages of the related art.

One aspect of the present disclosure is to provide a protective film that ensures improvement in the printing quality of the light shielding layer on the substrate.

Another aspect of the present disclosure is to provide a display apparatus including the protective film that ensures improvement in the printing quality of the light shielding layer.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a protective film may comprise a light shielding layer being disposed in the edge portion of one surface of a substrate, and the light shielding layer may include a second layer and a first layer being disposed under the second layer. The first layer may include a first portion being continuously disposed along the edge portion of the substrate, and a second portion being discontinuously disposed along the edge portion of the substrate.

In another aspect, a display apparatus may comprise a protective film that is disposed on a display panel and includes a substrate and a light shielding layer being disposed in the edge portion of the substrate, which corresponds to a non-display area of the display panel. The light shielding layer may include a first layer and a second layer on the first layer. The first layer may include at least two or more of first patterns that are spaced from each other and a plurality of second patterns that are disposed between at least two or more of the first patterns.

Particulars in relation to the other embodiments are included in the detailed description and drawings.

In the embodiments, provided is a protective film in which a first layer having patterns is formed on a substrate, thereby ensuring improvement in the printing quality of the second layer on the substrate.

In the embodiments, provided is a display apparatus including a protective film, in which a first layer having patterns is formed on a substrate, thereby ensuring improvement in the printing quality of the second layer on the substrate, and a display panel.

Advantages according to the present disclosure are not limited to the above ones, and other advantages that are not mentioned above can be clearly understood from the following description by one having ordinary skill in the art.

It is to be understood that both the foregoing general description and the following detailed description are exemplary and explanatory and are intended to provide further explanation of the inventive concepts as claimed

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
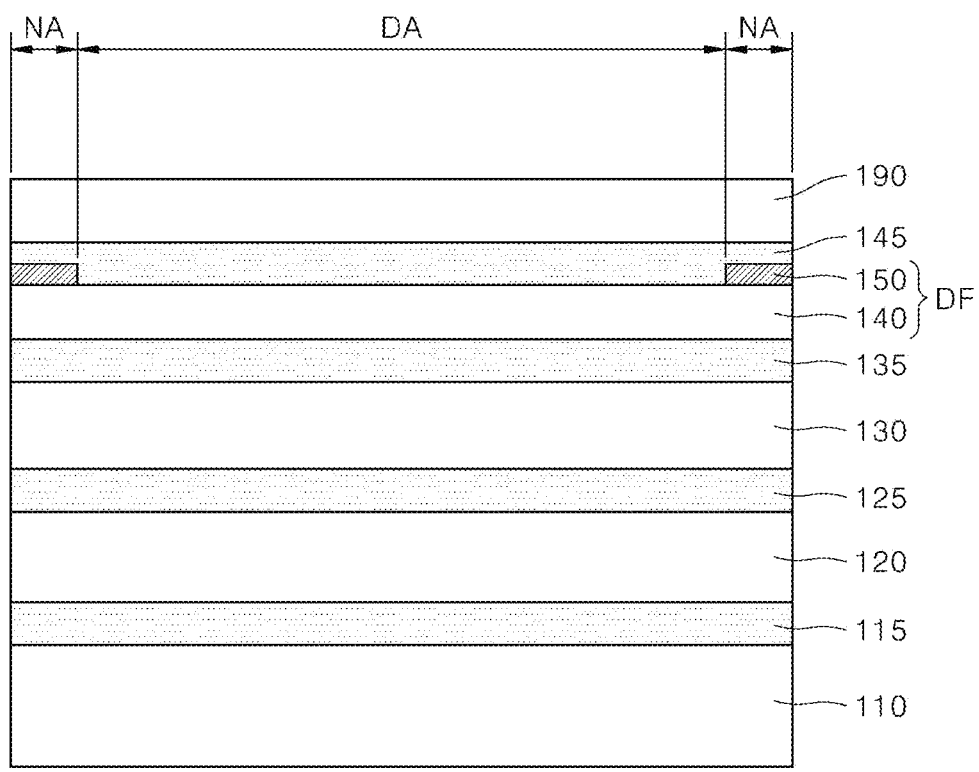
FIG. 1 is a cross-sectional view showing a display apparatus according to an embodiment of the present disclosure.

Advantages and features in the present disclosure and a method of achieving the same can be clearly understood from embodiments that are described with reference to the accompanying drawings. The subject matter of the present disclosure, however, can be embodied in various different forms, and should not be construed as being limited to the embodiments set forth herein. Rather, the embodiments are provided as examples so that the present disclosure can be thorough and complete and that the scope of the disclosure will be fully conveyed to one having ordinary skill in the art. The subject matter of the present disclosure should be defined only according to the scope of the appended claims.

The shapes, sizes, ratios, angles, number and the like of the components illustrated in the drawings provided for describing the embodiments of the present disclosure are given only as examples, and the subject matter of the present disclosure is not limited by the drawings. Throughout the disclosure, like reference numerals denote like components. In describing the subject matter, detailed description of well-known technologies relevant to the present disclosure is omitted if it is deemed to make the gist of the disclosure unnecessarily vague. Throughout the disclosure, the terms "comprising", "having", "being comprised of" and the like should imply the inclusion of any other component, but for the term "only". Further, the singular forms "a", "an" and "the" are intended to include the plural forms as well.

In describing a component, the margin of error should be included, though not explicitly described.

In the disclosure, when spatial terms such as "being on", "being in an upper portion", "being in a lower portion", "being adjacent to" and the like are used to describe a position relationship between two components, one or more additional components can be interposed between the two components unless terms such as "right" or "directly" are used.

In describing components, terms such as first, second and the like can be used. These terms are only intended to distinguish a component from another component, and the components are not limited by such terms. Accordingly, a first component described below can be a second component within the technical spirit of the disclosure.

Throughout the disclosure, identical reference numerals can denote identical components.

The size and thickness of each component in the drawings are to provide convenience for description, and the size and thickness of each component are not necessarily limited to the size and thickness illustrated in the drawings.

Features of the embodiments of the disclosure can be partially or entirely mixed or combined, and can technically interlock and operate in various ways as one having ordinary skill in the art understands sufficiently. Further, each embodiment can be embodied independently, or in connection with each other.

Hereafter, protective films and display apparatuses according to embodiments are specifically described with reference to the accompanying drawings.

FIG. 1 is a cross-sectional view showing the display apparatus according to an embodiment.

Referring to FIG. 1, the display apparatus in the embodiment may include a display area (DA) and a non-display area (NA). The display area (DA) may be an area in which an image is displayed. The non-display area (NA) may be an area which is located at a periphery of the display area (DA) and in which an image is not displayed. When the display apparatus in the embodiment is a foldable display apparatus, the display apparatus may further include a foldable area that is formed around a fold axis and overlaps a portion of the display area (DA) and a portion of the non-display area (NA). The foldable area may be an area that may be bent at a predetermined curvature when the display apparatus is folded.

The display apparatus in the embodiment may include a display panel 120, a support structure 110, a polarizing plate 130, a protective film DF, and a cover window 190.

The display panel 120 may display an image. The display panel 120 may be flexible and display an image for a user. For example, the display panel 120 may be an organic light-emitting display panel, but not limited. The display panel 120 may include various types of display panels such as a liquid crystal display panel, an electrophoretic display panel and the like. When the display panel 120 is an organic light-emitting display panel, the display panel 120 may include a thin film transistor array where thin film transistors (including switching thin film transistors and driving thin film transistors, for example) are formed for each pixel on a board, an organic light-emitting layer where organic light-emitting elements connecting to the driving thin film transistors are formed for each pixel, and an encapsulation layer which covers the organic light-emitting layer and prevents moisture and oxygen from coming into the organic light-emitting layer. The display panel 120 may further include a touch electrode array formed on the encapsulation layer.

The support structure 110 may support the display panel 120. The support structure 110 may include at least one of support layers. The support layer may be attached to the display panel 120 using an adhesive layer. The support layer has greater stiffness than the display panel 120. For example, the support layer may be comprised of a metal material such as stainless steel (SUS) or a polymer such as polymethylmetacrylate (PMMA), polycarbonate (PC), polyacrylate (PA), polyvinyl alcohol (PVA), acrylonitrile-butadiene-styrene (ABS), and polyethylene terephthalate (PET), but is not limited thereto. The support structure 110 may have a structure in which two or more support layers are bonded or attached to each other by an adhesive layer. When the display apparatus in the embodiment is a foldable display apparatus, a plurality of folding patterns may be formed in at least one or more of the support layers among the support layers and in a discontinuous form and in an area corresponding to the foldable area. The folding patterns may be holes or slits that pass through the support layer, but not limited.

The polarizing plate 130 may be provided to secure the visibility of the display panel 120. For example, the polarizing plate 130 may include a polarizer, and a retardation film disposed on one surface of the polarizer.

The protective film DF may be configured to conceal a driving circuit, various wires, a pad part and the like in the edge portion of the display panel 120. For example, the protective film DF may include a substrate 140, and a light shielding layer 150 disposed in the edge portion of the substrate 140. The substrate 140 may have ductility, for example. The light shielding layer 150 of the protective film DF may be disposed in the non-display area NA, and conceal the driving circuit, the various wires, the pad part and the like in the edge portion of the display panel 120.

The cover window 190 may include a polymer film or glass. For example, the polymer film may be transparent. The transparent polymer film may include polyethylene terephthalate (PET), colorless polyimide (PI), or a laminate of PET and colorless PI. A hard coating layer may be further disposed on the upper surface of the cover window 190. Additionally, the glass may be transparent.

The display apparatus in the embodiment may include a first adhesive layer 115, a second adhesive layer 125, a third adhesive layer 135, and a fourth adhesive layer 145. The first adhesive layer 115 may adhere the support structure 110 and the display panel 120 to each other. The second adhesive layer 125 may adhere the display panel 120 and the polarizing plate 130 to each other. The third adhesive layer 135 may adhere the polarizing plate 130 and the protective film DF to each other. The fourth adhesive layer 145 may adhere the protective film DF and the cover window 190 to each other. The first to fourth adhesive layers 115 to 145 may include an optically clear adhesive (OCA), but is not limited thereto.

Figure 2:
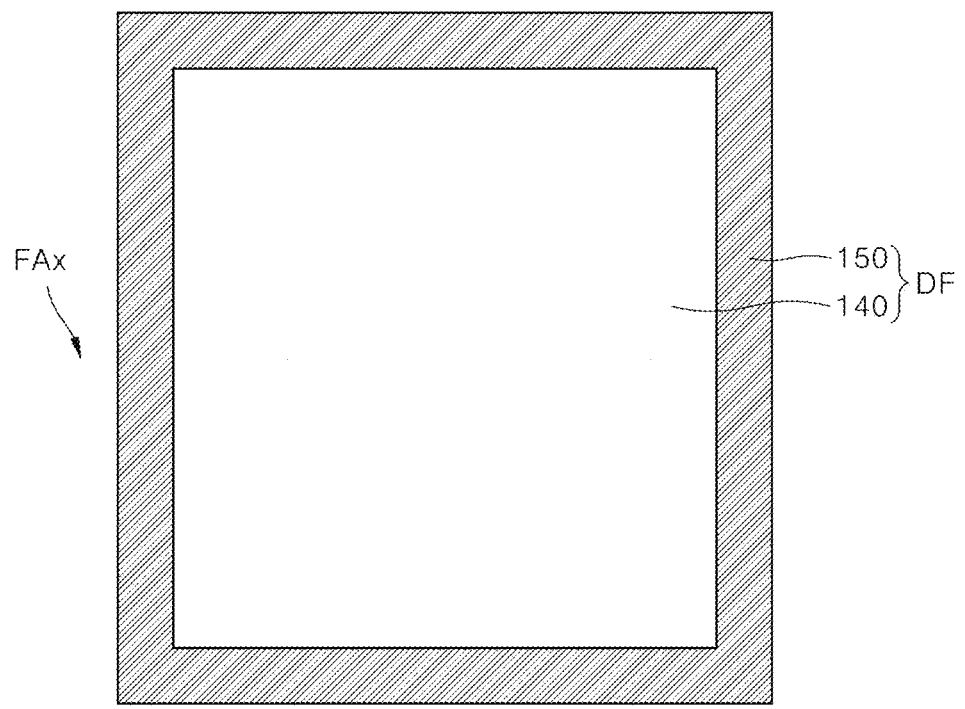
FIGS. 2 and 3 are a plan view and a cross-sectional view showing a protective film according to an embodiment of the present disclosure.
Figure 3:
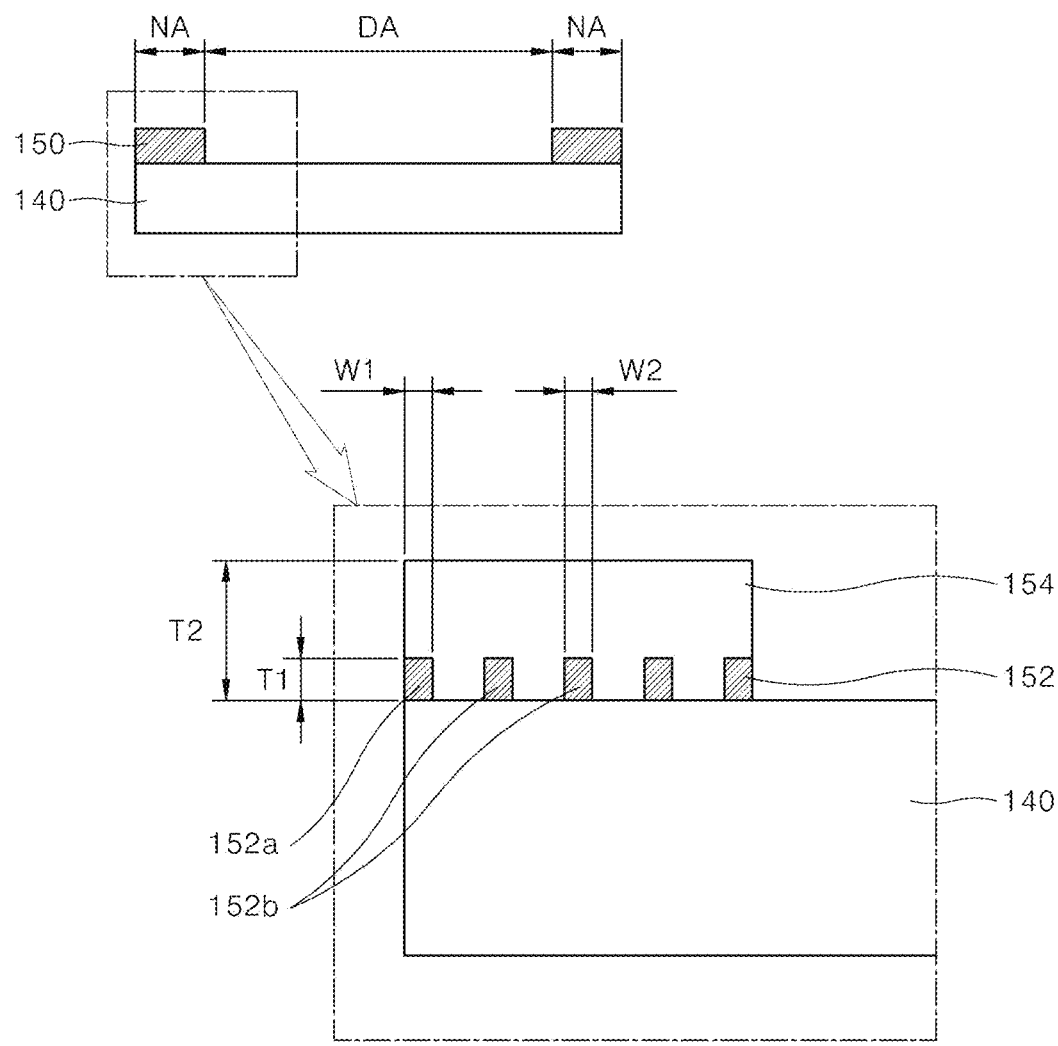
Figure 4:
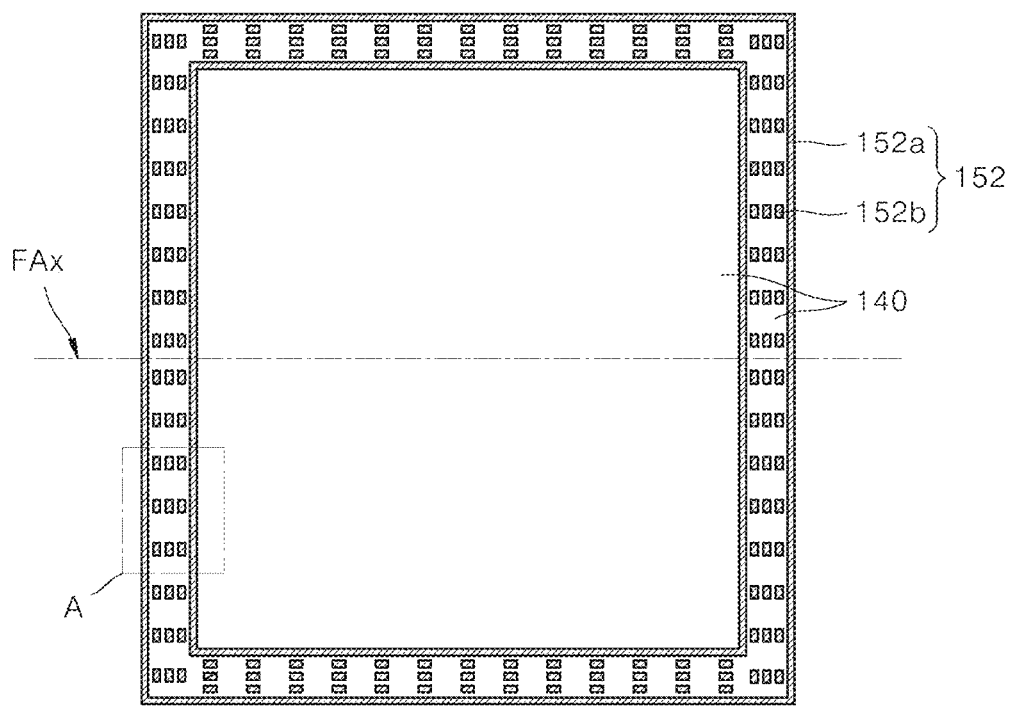
FIG. 4 is a plan view showing a first layer according to an embodiment of the present disclosure.
Figure 5:
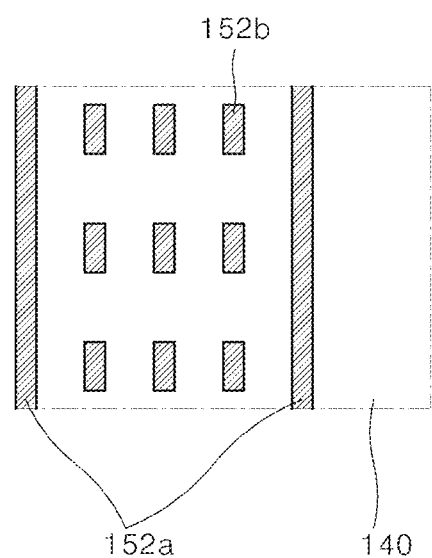
FIG. 5 is an enlarged plan view showing portion 'A' in FIG. 4.

FIGS. 2 and 3 are a plan view and a cross-sectional view showing a protective film in the embodiment. FIG. 4 is a plan view showing a first layer in the embodiment. FIG. 5 is an enlarged plan view showing portion 'A' in FIG. 4.

Referring to FIGS. 2 to 4, the protective film DF may include a substrate 140, and a light shielding layer 150 disposed in the edge portion of one surface of the substrate 140. The substrate 140 may flexible. For example, the substrate 140 may include a flexible polymeric film of polyimide (PI), polyethylene terephthalate (PET), propylene glycol (PPG), polycarbonate (PC) and the like, but is not limited thereto. The substrate 140 may have a thickness ranging from 23 μm to 75 μm, for example, but is not limited thereto.

The light shielding layer 150 may be disposed in the non-display area NA of the display apparatus. The light shielding layer 150 may be a black matrix or a blocking layer and the like and is not limited thereto. For example, the light shielding layer 150 may have a thickness ranging from 1 μm to 8 μm. In the case of a light shielding layer 150 having a thickness of less than 1 μm, the driving circuit, the various wirings, the pad part and the like in the edge portion of the display panel 120 may be visible. A light shielding layer 150 of a thickness of greater than 8 μm may have the following problems. First, since the adhesive material of the adhesive layer may not fill a step caused due to the light shielding layer 150, bubbles may be generated in the adhesive layer. Second, during a folding process, the light shielding layer 150 itself in the foldable area may have a crack. Therefore, the light shielding layer 150 may have a thickness ranging from 1 μm to 8 μm.

The light shielding layer 150 may have a ring shape. The light shielding layer 150 may include a first layer 152 formed on the edge of one surface of the substrate 140, and a second layer 154 formed on the first layer 152. For example, the first layer 152 may be an anchor layer and is not limited thereto. For example, the second layer 154 may be a printing layer and is not limited thereto.

The first layer 152 may include a first portion 152a and a second portion 152b. The first portion 152a may be continuously disposed along the edge portion of the substrate 140, for example. The second portion 152b may be discontinuously disposed along the edge portion of the substrate 140, for example. The first portion 152a may include at least two or more of first patterns that are spaced from each other, for example. At least two or more of the first patterns may include ring patterns, for example. The second portion 152b may include a plurality of second patterns that are disposed between at least two or more of the first patterns, for example.

The first layer 152 may be deposited using a deposition method such as physical vapor deposition or chemical vapor deposition and the like. For example, the first layer 152 is deposited and then patterned using the photolithography process and the etching process, or is patterned as the first layer 152 is deposited using a metal mask, such that the first layer 152 may be patterned to have the first portion 152a and the second portion 152b in the edge portion of one surface of the substrate 140. The second layer 154 may be printed on the first layer 152 formed in the edge portion of one surface of the substrate 140, using a printing method such as the inkjet method and the like.

The protective film DF in the embodiment includes the first layer 152 having the first portion 152a and the second portion 152b disposed in the edge portion of one surface of the substrate 140, thereby ensuring improvement in the printing quality of the second layer 154.

Without the first layer 152 on the substrate 140, printing defects such as protruding or roughness and the like occur when the second layer 154 is printed, and due to low adhesive strength, a defect in which the second layer 154 is peeled occurs. In the case of a foldable display as the display apparatus, the peeling of the second layer 154 may occur in the foldable area around the fold axis FAx. In the embodiment, the first layer 152 is formed on the substrate 140 and then the second layer 154 is printed or formed. As a result, when the second layer 154 is printed or formed, printing defects such as loss, protruding and/or roughness and the like in printing decrease, and an adhesive strength improves, thereby ensuring improvement in the printing quality of the second layer 154. The first layer 152 may help to increase the contact surface of the surface on which the second layer 154 is printed or formed, and guide the second layer 154. The first portion 152a and the second portion 152b of the first layer 152 may increase the contact surface. The first portion 152a of the first layer 152 may guide the second layer 154 such that the second layer 154 is printed or formed only in the non-display area, i.e., the second layer 154 does not escape from the non-display area.

The plurality of second patterns constituting the second portion 152b is disposed between at least two or more of the first patterns and in at least three or more rows, thereby increasing the contact surface. The plurality of second patterns may have a shape that is elongated in one direction. The plurality of second patterns may have a bar shape that is elongated in a direction parallel with a direction where the first patterns are elongated. The plurality of second patterns may have a rectangle-shaped cross section. Three or more rows of the second patterns may be disposed in the same position in the direction where the first patterns are elongated. The first patterns of the first portion 152a may be configured in the same direction as the second patterns of the second portion 152b, for example. The first patterns of the first portion 152a may be configured in parallel with the second patterns of the second portion 152b, for example. Accordingly, the first patterns of the first portion 152a and the second patterns of the second portion 152b are formed in the same processing step, thereby simplifying the processing procedure or the processing step.

The first layer 152 may be made of an inorganic material. The second layer 154 may be made of black ink, for example. In the case of a second layer 154 made of black ink, the inorganic material may include at least any one of carbon nano-fiber, carbon nano-tube, graphene or chromium (Cr), to minimize a difference in the colors of the second layer 154 and the first layer 152.

The thickness T1 of the first layer 152, e.g., the thickness of the first patterns and the second patterns may be one tenth or less of the thickness T2 of the light shielding layer 150, for example. The thickness T2 of the light shielding layer 150 may be 1 to 8 µm, and the thickness T1 of the first layer 152 may be 10 to 100 nm, for example. The width W1 of the first patterns and the width W2 of the second patterns may be one tenth or less of the thickness of the light shielding layer 150. One or more of the width W1 of the first patterns and the width W2 of the second patterns may be 10 to 100 nm, for example. The width W1 of the first patterns and the width W2 of the second patterns may be the same within the above range. The width W2 of the second patterns may be dimensions of dot patterns in a direction perpendicular to the direction where the second patterns are elongated.

For example, when the thickness and width of the first patterns and the second patterns is greater than one tenth of the thickness of the light shielding layer 150, e.g., greater than 100 nm, because of a difference in the colors of a material forming the first layer 152 and a material forming the second layer 154, the first patterns and the second patterns may be visible. Therefore, the thickness and width of the first patterns and the second patterns may be one tenth or less of the thickness T2 of the light shielding layer 150, e.g., 100 nm or less.

In FIG. 4, the first portion 152*a* includes two first patterns that are spaced from each other, but is not limited thereto. For example, the first portion 152*a* may include three first patterns that are spaced from one another, and the second portion 152*b* including a plurality of second patterns may be disposed among the three first patterns that are spaced from one another. For example, the first portion 152*a* may include four first patterns that are spaced from one another. In the first portion 152*a*, two first patterns form a single group, and two groups of first patterns may be disposed along the boundary between the display area and the non-display area and along the outermost edge of the substrate 140. Additionally, the second portion 152*b* including the plurality of second patterns disposed between the two groups of first patterns may be disposed. For example, the first portion 152*a* may include two or more of first patterns.

Figure 6:
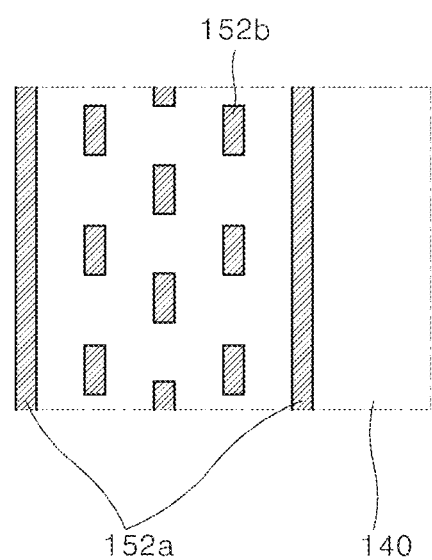
FIGS. 6 to 8 are plan views showing various ways of disposing patterns of the first layer according to embodiments of the present disclosure.
Figure 7:
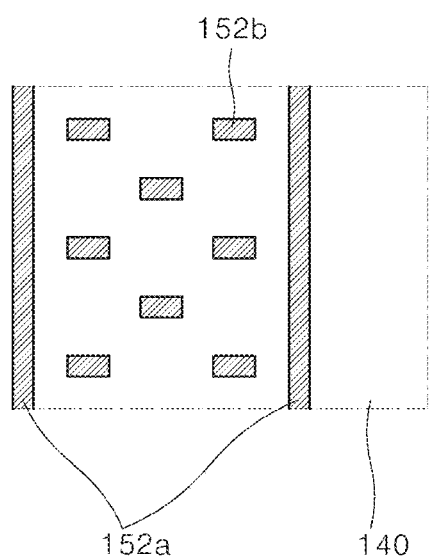
Figure 8:
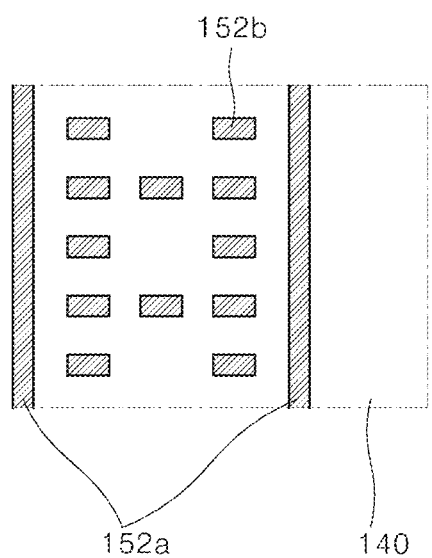

FIGS. 6 to 8 are plan views showing various ways of disposing patterns of the first layer according to embodiments.

Referring to FIG. 6, the plurality of second patterns constituting the second portion 152*b* is disposed in at least three or more rows between at least two or more of first patterns, and has a shape that is elongated in a direction parallel with the direction where the first patterns are elongated. A portion of three or more rows of the second patterns may be disposed at positions shifted from each other in the direction where the first patterns are elongated. For example, the second patterns in the first row and the second patterns in the third row may be disposed in the same position in the direction where the first patterns are elongated. For example, the second patterns in the second row may be disposed to be shifted from the second patterns in the first row and the second patterns in the third row in the direction where the first patterns are elongated. For example, the first patterns of the first portion 152*a* may be configured in the same direction as the second patterns of the second portion 152*b*. For example, the first patterns of the first portion 152*a* may be parallel with the second patterns of the second portion 152*b*. Accordingly, the first patterns of the first portion 152*a* and the second patterns of the second portion 152*b* may be formed in the same processing step, thereby simplifying the processing procedure or the processing step.

Referring to FIG. 7, the plurality of second patterns constituting the second portion 152*b* is disposed in at least three or more rows between at least two or more of first patterns, and has a shape that is elongated in a direction perpendicular to the direction where the first patterns are elongated. A portion of three or more rows of the second patterns may be disposed at positions shifted from each other in the direction where the first patterns are elongated. For example, the second patterns in the first row and the second patterns in the third row may be disposed in the same position in the direction where the first patterns are elongated, and the second patterns in the second row may be disposed to be shifted from the second patterns in the first row and the second patterns in the third row in the direction where the first patterns are elongated. For example, the second patterns of the second portion 152*b* may be configured in the same direction as the fold axis FAx. For example, the second patterns of the second portion 152*b* may be configured in a direction parallel with the fold axis FAx. Accordingly, the substrate 140 may only be folded rather than the second patterns of the second portion 152*b*. This structure may be advantageous at a time of folding. Since the substrate 140 is only folded rather than the second patterns of the second portion 152*b*, the occurrence of a crack and the like caused during the folding process may be reduced or prevented.

Referring to FIG. 8, the plurality of second patterns constituting the second portion 152*b* is disposed in at least three or more rows between at least two or more of first patterns, and has a shape that is elongated in a direction perpendicular to the direction where the first patterns are elongated. A portion of three or more rows of the second patterns may have lower arrangement density than the other rows of the second patterns. For example, the second patterns in the second row may have higher arrangement density than the second patterns in the first row and the second patterns in the third row. The arrangement density may mean how many second patterns are arranged per unit length. The second patterns in the first row and the second patterns in the third row having higher arrangement density may help to increase a contact surface, and similar to the first pattern, play a role in guiding the second layer 154.

Figure 9:
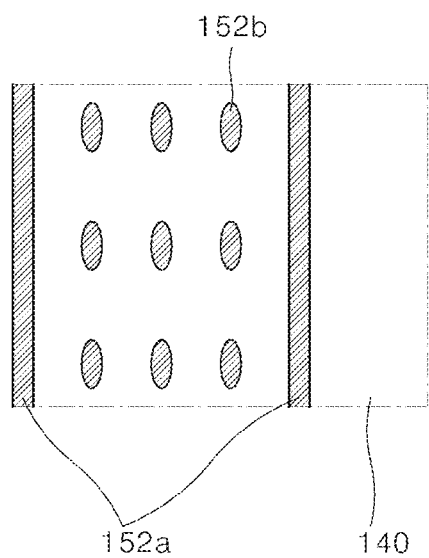
FIGS. 9 and 10 are plan views showing various shapes of the patterns of the first layer according to embodiments of the present disclosure.
Figure 10:
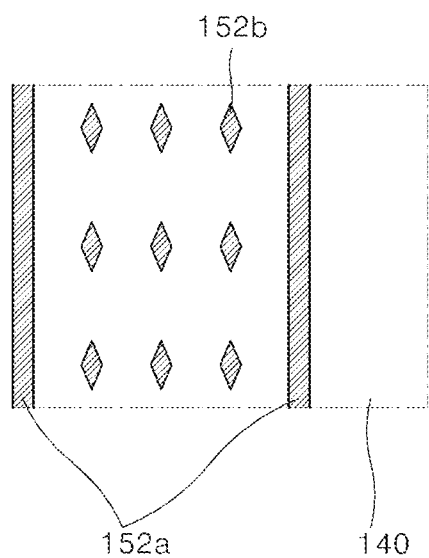

FIGS. 9 and 10 are plan views showing various shapes of the second patterns of the first layer according to embodiments.

Referring to FIGS. 9 and 10, the second patterns of the second portion 152*b* of the first layer 152 may have a cross section of a circle, an oval or a rhombus, unlike the second patterns illustrated in FIGS. 5 to 8. Additionally, the cross section of the second patterns of the second portion 152*b* of the first layer 152 may not be limited to the illustrated ones, and have various shapes such as a sphere, hemisphere, cross, star and the like. When the second patterns of the second portion 152*b* of the first layer 152 has a shape of a circle, a sphere or an oval, a contact area between the first layer 152 and the second layer 154 may increase, thereby improving an adhesive strength of the light shielding layer 150. The cross section of the second patterns of the second portion 152*b* of the first layer 152 may have proper shapes depending on an ink composition used to form the second layer 154.

Figure 11:
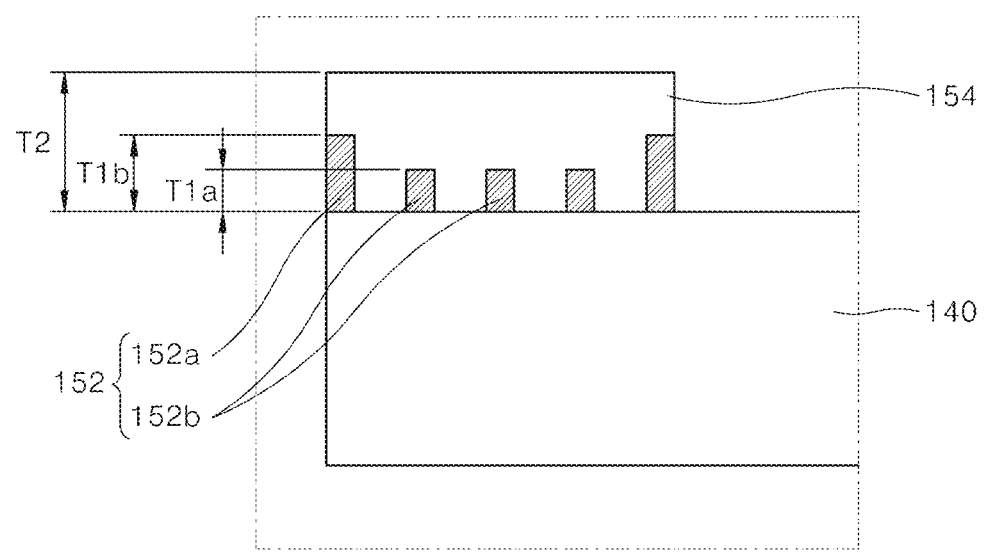
FIG. 11 is a cross-sectional view showing the protective film according to an embodiment of the present disclosure.

FIG. 11 is a cross-sectional view showing the protective film according to an embodiment.

The thickness T1b of the first portion 152a, e.g., the first patterns, may be greater than the thickness T1a of the second portion 152b, e.g., the second patterns. In this case, the first portion 152a may guide the second layer 154 better such that the second layer 154 is formed only in the non-display area without escaping from the non-display area. Further, in this case, the width W1 (see FIG. 3) of the first portion 152a, e.g., the first patterns, may be greater than the width W2 of the second portion 152b, e.g., the second patterns. When the thickness of the first patterns increases while the width of the first patterns remains the same, the structural reliability of the first patterns themselves may deteriorate.

The protective film and the display apparatus according to embodiments are described as follows.

According to an embodiment, the protective film includes a substrate and a light shielding layer being disposed in the edge portion of one surface of the substrate, the light shielding layer includes a first layer on the edge of one surface of the substrate and a second layer on the first layer, and the first layer includes a first portion being continuously disposed along the edge portion of the substrate and a second portion being discontinuously disposed along the edge portion of the substrate.

In some embodiments, the first portion may include at least two or more of first patterns that are spaced from each other, and the second portion may include a plurality of second patterns being disposed between at least two or more of the first patterns.

In some embodiments, at least two or more of the first patterns may include ring patterns.

In some embodiments, the plurality of second patterns may include dot patterns.

In some embodiments, the plurality of second patterns may be disposed in at least three or more rows between at least two or more of the first patterns.

In some embodiments, the plurality of second patterns may have a shape that is elongated in one direction.

In some embodiments, a thickness of the first layer may be one tenth or less of a thickness of the light shielding layer, the thickness of the light shielding layer may range from 1 to 8 µm, and the thickness of the first layer may range from 10 to 100 nm.

In some embodiments, a thickness of the first portion may be greater than a thickness of the second portion.

In some embodiments, widths of at least two or more of the first patterns and a width of the plurality of second patterns may be one tenth or less of the thickness of the light shielding layer.

In some embodiments, the first layer may be comprised of an inorganic material, and the second layer may be comprised of black ink.

In some embodiments, the inorganic material may be at least any one of carbon nano-fiber, carbon nano-tube, grapheme, and Cr.

The display apparatus in the embodiment may include a display panel and a protective film being disposed on the display panel, the protective film may include a substrate and a light shielding layer being formed in an edge portion of the substrate, which corresponds to a non-display area of the display panel, and the light shielding layer may include a first layer on an edge of one surface of the substrate and a printing layer on the first layer. The first layer may include at least two or more of first patterns being spaced from each other and a plurality of second patterns being disposed between at least two or more of the first patterns.

In some embodiments, at least two or more of the first patterns may include ring patterns.

In some embodiments, the plurality of second patterns may include dot patterns.

In some embodiments, the plurality of second patterns may be disposed in at least three or more rows between at least two or more of the first patterns.

In some embodiments, the first patterns and the plurality of second patterns have a thickness ranging from 10 to 100 nm.

In some embodiments, the thickness of the first layer may be one tenth or less of the thickness of the light shielding layer.

In some embodiments, the first layer may be comprised of an inorganic material including at least any one of carbon nano-fiber, carbon nano-tube, graphene, and Cr, and the second layer may be comprised of black ink.

It will be apparent to those skilled in the art that various modifications and variations can be made in the protective film and the display apparatus including the same the present disclosure without departing from the technical idea or scope of the disclosure. Thus, it is intended that the present disclosure cover the modifications and variations of this disclosure provided they come within the scope of the appended claims and their equivalents.

The invention claimed is:

1. A protective film, comprising:
a substrate; and
a light shielding layer being disposed in an edge portion of one surface of the substrate,
wherein the light shielding layer comprises a first layer on an edge of one surface of the substrate and a second layer on the first layer,
the first layer comprises a first portion being continuously disposed along the edge portion of the substrate and a second portion being discontinuously disposed along the edge portion of the substrate,
the first portion comprises at least two or more of first patterns that are spaced from each other, and the second portion comprises a plurality of second patterns being disposed between at least two or more of the first patterns, and
the first layer and the second layer are in direct contact with each other.

2. The protective film of claim 1, wherein at least two or more of the first patterns comprise ring patterns.

3. The protective film of claim 1, wherein the plurality of second patterns comprise dot patterns.

4. The protective film of claim 1, wherein the plurality of second patterns is disposed in at least three or more rows between at least two or more of the first patterns.

5. The protective film of claim 1, wherein the plurality of second patterns has a shape that is elongated in one direction.

6. The protective film of claim 1, wherein a thickness of the first layer is one tenth or less of a thickness of the light shielding layer.

7. The protective film of claim 6, wherein the thickness of the light shielding layer ranges from 1 µm to 8 µm, and the thickness of the first layer ranges from 10 to 100 nm.

8. The protective film of claim 1, wherein a thickness of the first portion is greater than a thickness of the second portion.

9. The protective film of claim 1, wherein one or more of a width of at least two or more of the first patterns and a width of the plurality of second patterns are one tenth or less of a thickness of the light shielding layer, and ranges from 10 to 100 nm.

10. The protective film of claim 1, wherein the first layer is comprised of an inorganic material, and the second layer is comprised of black ink.

11. The protective film of claim 10, wherein the inorganic material is at least any one of carbon nano-fiber, carbon nano-tube, graphene, and chromium.

12. The protective film of claim 1, wherein the first patterns of the first portion are configured in parallel with the second patterns of the second portion, and wherein the first patterns of the first portion and the second patterns of the second portion are formed in the same processing step.

13. A display apparatus, comprising:
a display panel; and
the protective film according to claim 1 disposed on the display panel,
wherein the light shielding layer corresponds to a non-display area of the display panel.

14. The display apparatus according to claim 13, wherein the display panel comprises a display area; the non-display area located at a periphery of the display area and in which an image is not displayed; and a foldable area formed around a fold axis and overlapping a portion of the display area and a portion of the non-display area, and
wherein the foldable area is an area that is bent at a predetermined curvature when the display apparatus is folded.

15. The display apparatus of claim 14, wherein the second patterns are configured in a direction parallel with the fold axis, such that only the substrate is folded rather than the second patterns.

16. A display apparatus, comprising:
a display panel; and
a protective film being disposed on the display panel,
wherein the protective film comprises a substrate and a light shielding layer being disposed in an edge portion of the substrate, which corresponds to a non-display area of the display panel,
the light shielding layer comprises a first layer on an edge of one surface of the substrate and a second layer on the first layer,
the first layer comprises at least two or more of first patterns being spaced from each other, and a plurality of second patterns being disposed between at least two or more of the first patterns, and
the first layer and the second layer are in direct contact with each other.

17. The display apparatus of claim 16, wherein at least two or more of the first patterns comprise ring patterns.

18. The display apparatus of claim 16, wherein the plurality of second patterns comprise dot patterns.

19. The display apparatus of claim 16, wherein the plurality of second patterns is disposed in at least three or more rows between at least two or more of the first patterns.

20. The display apparatus of claim 16, wherein at least two or more of the first patterns and the plurality of second patterns have a thickness ranging from 10 to 100 nm.

21. The display apparatus of claim 16, wherein a thickness of the first layer is one tenth or less of a thickness of the light shielding layer.

22. The display apparatus of claim 16, wherein the first layer is comprised of at least any one of carbon nano-fiber, carbon nano-tube, graphene, and chromium, and
the second layer is comprised of black ink.

23. The display apparatus of claim 16, wherein the first patterns are configured in parallel with the second patterns, and wherein the first patterns and the second patterns are formed in the same processing step.

24. The display apparatus of claim 16, wherein the display panel comprises a display area; the non-display area located at a periphery of the display area and in which an image is not displayed; and a foldable area formed around a fold axis and overlapping a portion of the display area and a portion of the non-display area, and
wherein the foldable area is an area that is bent at a predetermined curvature when the display apparatus is folded.

25. The display apparatus of claim 24, wherein the second patterns are configured in a direction parallel with the fold axis, such that only the substrate is folded rather than the second patterns.

26. A display apparatus, comprising:
a display panel; and
a protective film being disposed on the display panel,
wherein the protective film comprises a substrate and a light shielding layer being disposed in an edge portion of the substrate, which corresponds to a non-display area of the display panel,
wherein the light shielding layer comprises a first layer on an edge of one surface of the substrate and a second layer on the first layer,
wherein the first layer comprises at least two or more of first patterns being spaced from each other, and a plurality of second patterns being disposed between at least two or more of the first patterns,
wherein the display panel comprises a display area; the non-display area located at a periphery of the display area and in which an image is not displayed; and a foldable area formed around a fold axis and overlapping a portion of the display area and a portion of the non-display area,
wherein the foldable area is an area that is bent at a predetermined curvature when the display apparatus is folded, and
wherein the second patterns are configured in a direction parallel with the fold axis, such that only the substrate is folded rather than the second patterns.

27. A display apparatus, comprising:
a display panel; and
a protective film being disposed on the display panel,
wherein the protective film comprises a substrate and a light shielding layer being disposed in an edge portion of one surface of the substrate,
wherein the light shielding layer comprises a first layer on an edge of one surface of the substrate and a second layer on the first layer,
wherein the first layer comprises a first portion being continuously disposed along the edge portion of the substrate and a second portion being discontinuously disposed along the edge portion of the substrate,
wherein the first portion comprises at least two or more of first patterns that are spaced from each other, and the second portion comprises a plurality of second patterns being disposed between at least two or more of the first patterns,
wherein the display panel comprises a display area; the non-display area located at a periphery of the display area and in which an image is not displayed; and a foldable area formed around a fold axis and overlapping a portion of the display area and a portion of the non-display area,
wherein the foldable area is an area that is bent at a predetermined curvature when the display apparatus is folded, and wherein the second patterns are configured in a direction parallel with the fold axis, such that only the substrate is folded rather than the second patterns.

\* \* \* \* \*